(12) United States Patent
Jarman

(10) Patent No.: US 11,924,523 B2
(45) Date of Patent: Mar. 5, 2024

(54) METHOD AND SYSTEM FOR MIDSTREAM FILTERING OF AUDIO AND VIDEO CONTENT

(71) Applicant: Clearplay, Inc., Salt Lake City, UT (US)

(72) Inventor: Matt Jarman, Salt Lake City, UT (US)

(73) Assignee: ClearPlay, Inc., Salt Lake City, UT (US)

( * ) Notice: Subject to any disclaimer, the term of this patent is extended or adjusted under 35 U.S.C. 154(b) by 0 days.

(21) Appl. No.: 16/229,720

(22) Filed: Dec. 21, 2018

(65) Prior Publication Data

US 2019/0200094 A1 Jun. 27, 2019

Related U.S. Application Data

(60) Provisional application No. 62/609,302, filed on Dec. 21, 2017.

(51) Int. Cl.
*H04N 21/647* (2011.01)
*H04L 65/00* (2022.01)
*H04L 65/612* (2022.01)
*H04N 21/61* (2011.01)
*H04N 21/845* (2011.01)

(52) U.S. Cl.
CPC ....... *H04N 21/64784* (2013.01); *H04L 65/00* (2013.01); *H04L 65/612* (2022.05); *H04N 21/6125* (2013.01); *H04N 21/64761* (2013.01); *H04N 21/8456* (2013.01)

(58) Field of Classification Search
CPC ......... H04N 21/64784; H04N 21/6125; H04N 21/64761; H04N 21/8456; H04L 65/00; H04L 65/4084; H04L 65/612
See application file for complete search history.

(56) References Cited

U.S. PATENT DOCUMENTS

| | | | | |
|---|---|---|---|---|
| 6,016,316 A * | 1/2000 | Moura | ............... | H04B 7/18523 370/389 |
| 8,156,518 B2 * | 4/2012 | O'Hern | ............... | H04H 60/58 725/28 |
| 8,245,252 B2 * | 8/2012 | Gee | ............... | H04N 21/4751 725/36 |
| 9,363,561 B1 * | 6/2016 | Harmon | ............... | H04N 21/266 |
| 2001/0020944 A1 * | 9/2001 | Brown | ............... | G05B 19/4185 345/474 |
| 2003/0061206 A1 * | 3/2003 | Qian | ............... | G06F 16/48 |

(Continued)

*Primary Examiner* — Adil Ocak
(74) *Attorney, Agent, or Firm* — Polsinelli PC; Derek D. Donahoe

(57) ABSTRACT

In one embodiment, a method for filtering streaming media content includes receiving at a filtering device one or more packets of a source data stream. The one or more packets are may be received from a content source remote from the filtering device. The source data stream may include one or more of an audio component and a video component. The method further includes determining whether to perform a filtering action on the one or more packets of the source data stream based at least in part on one or more user settings. The method further includes communicating to a media-playing device a filtered data stream generated at least in part by performing the filtering action on the one or more packets of the source data stream.

17 Claims, 6 Drawing Sheets

(56) References Cited

U.S. PATENT DOCUMENTS

| | | | |
|---|---|---|---|
| 2003/0088778 A1* | 5/2003 | Lindqvist | H04N 7/16 |
| | | | 713/182 |
| 2013/0117464 A1* | 5/2013 | Brown | H04L 12/1827 |
| | | | 709/232 |
| 2014/0115181 A1* | 4/2014 | Wu | H04L 67/26 |
| | | | 709/231 |
| 2015/0334101 A1* | 11/2015 | Bruchner | G06Q 10/10 |
| | | | 726/3 |

* cited by examiner

METHOD AND SYSTEM FOR MIDSTREAM FILTERING OF AUDIO AND VIDEO CONTENT

CROSS-REFERENCE

The present application is a non-provisional application claiming priority under 35 U.S.C. § 119 to provisional application No. 62/609,302 titled "Systems and Methods for Midstream Filtering of Audio and Video Content," filed Dec. 21, 2017, which is hereby incorporated by reference herein.

TECHNICAL FIELD

The present disclosure relates generally providing a midstream filtering function, within the communication path between a content source and the user's content player, that is configured to filter portions of requested audio and/or video content.

BACKGROUND

Technology currently exists which allows the user of a media playback device to filter objectionable content of a resident audio or video presentation, such as a motion picture, during playback. This technology allows, for example, the viewing of a movie originally containing content an audience may find objectionable. The filter indicates which portions of the audio or video presentation are to be skipped, or which audio portions are to be muted, by the player during playback.

Conventionally, the filtering function is provided at a content source (e.g., a server, a DVD, a Blu-ray disc, etc.) or at the content player (e.g., phones, tablets, televisions, computers, DVD player, Blu-ray player, etc.) including, at times, at both locations. Among other drawbacks, these conventional implementations generally require that the filtering provider be able to directly access and interface with the content source and/or the content player. Problems with this approach arise, for example, when the filtering provider does not have suitable access to filter the content at either the content source or at the content player. Suitable access, at times, may require the filtering provider to have an agreement with the provider(s) of either the content source and/or the content player, which is not always possible or practical. Even if the filtering provider does have suitable access, filtering at either the content source or content player (or both) often requires modifications to adapt to various and ever-changing technologies, configurations, software versions, hardware, communication protocols, etc. utilized by a variety of different content sources and/or content players. For streaming media content in particular, filtering at the content source generally requires filtering providers to account for various content providers (e.g., Amazon Video, Netflix, Hulu, GooglePlay, etc.) and their respective and distinct technologies.

Certain teachings of the present disclosure address and overcome these and other technical drawbacks of conventional methods and systems for filtering media content by providing a midstream filtering function, within the communication path between a content source and the user's content player, that is configured to filter portions of requested audio and/or video content.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Overview

Figure 1:
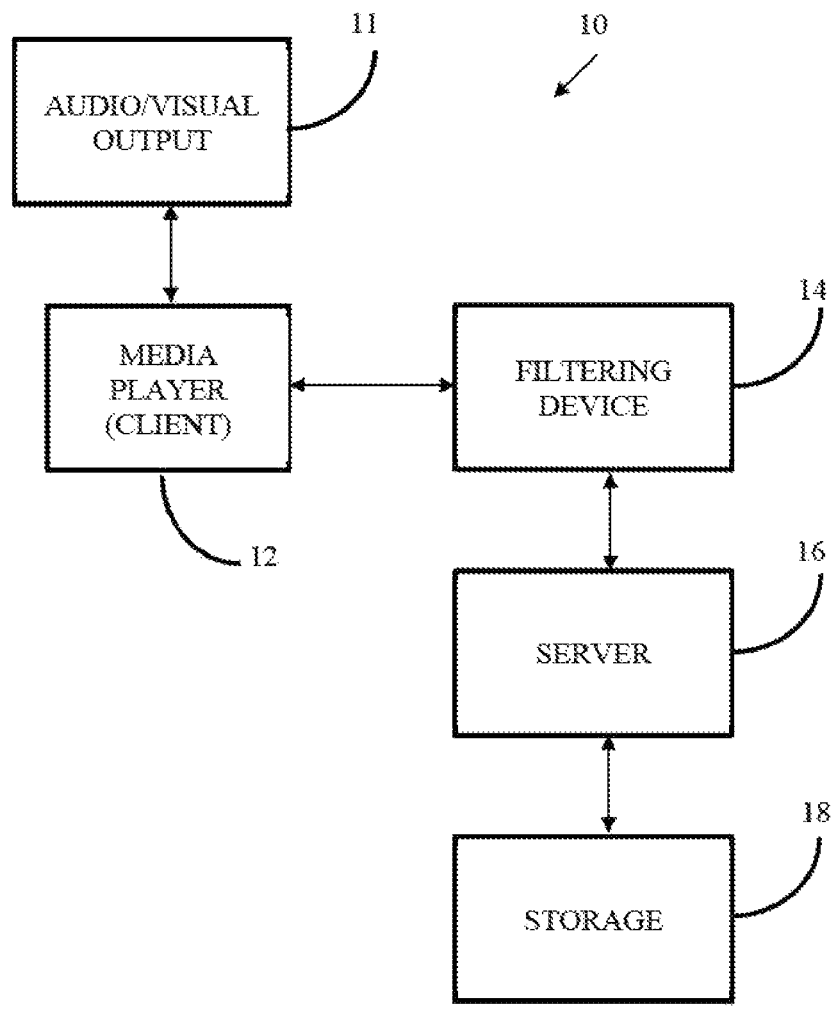
FIG. 1 is a block diagram illustrating a client-server system, in accordance with certain example embodiments.

Generally, embodiments of the present disclosure relate to providing a midstream filtering function, within the communication path between a content source and the user's content player, that is configured to filter portions of requested audio and/or video content.

In one embodiment, a method for filtering streaming media content includes receiving at a filtering device one or more packets of a source data stream. The one or more packets are may be received from a content source remote from the filtering device. The source data stream may include one or more of an audio component and a video component. The method further includes determining whether to perform a filtering action on the one or more packets of the source data stream based at least in part on one or more user settings. The method further includes communicating to a media-playing device a filtered data stream generated at least in part by performing the filtering action on the one or more packets of the source data stream.

Technical advantages of various embodiments of the present disclosure include providing a filtering function within the communication path between a content source and the user's content player that is configured to filter or suppress portions of requested audio and/or video content. The content filtration/suppression can be the entire content, sections of content, or specific moments of the content. The content filtration/suppression may involve suppressing one or more channels of audio for a specific period of time. Audio suppression can be achieved, for example, by replacing audio information that contains audible content with audio information that does not contain audible content and/or removing the audio packet in its entirety.

Particular embodiments, for example, override the conventional functionality of a midstream filtering device(s)

(e.g., a modem/router at a user's residence) to effect selective, user-controlled filtering/suppression of streaming media content after it is transmitted from a content source and before it is received at the user's content player. Filtering at a midstream filtering device may, in certain instances, be effected independently of the content source configurations, the content player configurations, the various content playback devices, and the various content providers. Certain embodiments may filter/suppress audio and/or video information, for example, from exiting a midstream filtering device.

Various embodiments use a midstream filtering device to request only playable content from the source in a manner that efficiently eliminates the need to communicate unwanted portions of the content (e.g., profane language, sexually explicit content, and so on) that would otherwise need to be filtered out per a user's filtration settings. For example, the midstream filtering device may be configured to send instructions back to the content source to jump ahead in the streaming of the content.

Other technical advantages of the present disclosure will be apparent to one skilled in the art from the teachings of the present disclosure. Moreover, while specific advantages have been enumerated above, various embodiments may include all, some, or none of the described advantages.

DESCRIPTION OF EXAMPLE EMBODIMENTS

Various embodiments are now described with reference to the drawings, wherein like reference numerals are used to refer to like elements throughout. In the following description, for purposes of explanation, numerous specific details are set forth in order to provide a thorough understanding of one or more embodiments. However, this disclosure may be practiced without some or all of these specific details, as will be evident to one having ordinary skill in the art. In other instances, well-known process steps or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

FIG. 1 illustrates a system 10 having a configuration conforming to certain example embodiments. Generally, system 10 is in a client-server arrangement (i.e., including client 12 and content server 16). The client 12 may be a client-side computing platform having any suitable computing arrangement capable of receiving and playing streaming media content. In one particular example, client 12 is a user's media player (e.g., phone, tablet, television, laptop/desktop computer, DVD player, Blu-ray player, etc.) including or coupled with an audio/visual output 11 (e.g., a display and/or speaker(s)). The content server 16 may be a server-side computing platform having any suitable computing arrangement capable of being a source for providing streaming media content having audio and/or video components. The content server 16 may be operable coupled with some form of data storage arrangement 18 generally configured to store the media content. In one particular arrangement, the content server 16 includes one or more server workstations having a Linux based operating system and a file system (hard drive and drivers for accessing content) where the media content is stored; however, any suitable arrangement may be used.

A filtering device 14 is disposed within a communication path between content server 16 and client 12—i.e., it is midstream. Filter device 14 generally provides a filtering function configured to filter portions of requested media content having audio and/or video components (e.g., video, music, etc.).

Filter device 14 may be implemented at any suitable location somewhere midstream between content server 16 and client 12. In one particular embodiment, filtering device 14 includes, or is communicatively coupled to, a router and/or modem connecting client 12 and/or filtering device 14 to a network, such as the Internet. Filtering device 14 may be implemented within a wireless repeater or extender. In various embodiments, filtering device 14 is implemented at a cellular transmission tower of a telephone cellular network. In certain embodiments, filtering device 14 is implemented at a midstream server capable of serving multiple ender user's simultaneously. In certain applications, filtering device 14 may be specially configured (including, for example, the various filtering settings stored therein) for use within a home, school, church, or a place of business; however, the teachings of the present disclosure may apply in a variety of different applications.

In certain embodiments, filtering device 14 may enable a user to provide input regarding the user's desired filtration settings. For example, a user may wish to configure its settings to filter out profane language, sexually explicit content, graphic violence, advertisements, and so on. Filtering device 14 may be configured to store a user's settings locally (e.g., within storage of filtering device 14 itself or local storage accessible to filtering device 14). Alternatively, filtering device 14 may be configured to store and/or retrieve a user's settings from a remote location, such as within cloud storage accessible via the Internet.

The operation of certain example embodiments may be summarized at a high level as follows. A user may desire to stream specific media content (e.g., a particular video, movie, television program, song, etc.). A corresponding request for that specific media content may be transmitted via filtering device 14 to content server 16. Content server 16 responds to the request by retrieving the requested media content (e.g., from storage 18) and transmitting the requested media content. Filtering device 14 may perform a filtering function on the media content received from server 16. The filtering function is generally synchronized to user controlled settings. In certain embodiments, for example, as a result of the filtering function, filtering device 14 may transmit only a portion (though not all) the media data received from content server 16.

In certain embodiments, the media content processed by filtering device 14 for playback at the client 12 may be sent directly to client 12. Alternatively, client 12 may be instructed by filtering device 14 to connect to a remote spoofing/browser emulation device and stream the requested media content from that emulation device. The emulation device is not necessarily the original content server 16 from which client 12 requested media content. It will be appreciated that, in certain instances, the filtering device 14 may be implemented as part of a router/modem that connects the client 12 (e.g., via the Internet) to the emulation device.

Additional operational detail may be further explained in the example context of streaming a particular requested movie from a streaming service provided at server 16. In this example, certain video and/or audio content, transmitted by server 16 and routed through filtering device 14 to client 12, may be filtered by filtering device 14, such that the movie continuously streams to the client 12 for playback without the filtered content. During the movie-streaming process, filtering device 14 may intelligently request only certain portions of the streaming content, while purposefully not requesting others, thereby avoiding overtaxing the server 16 with requests for media content that filtering device 14 would otherwise need to filter out under a user's particular settings. In the instance where a particular movie scene should be filtered out in accordance with a user's settings, for example, filtering device 14 may configure its real-time streaming requests to server 16 in a manner that causes the server 16 to automatically skip forward in the transmission of the streaming content, thereby avoiding having to transmit the objectionable content in the first place.

Figure 2:
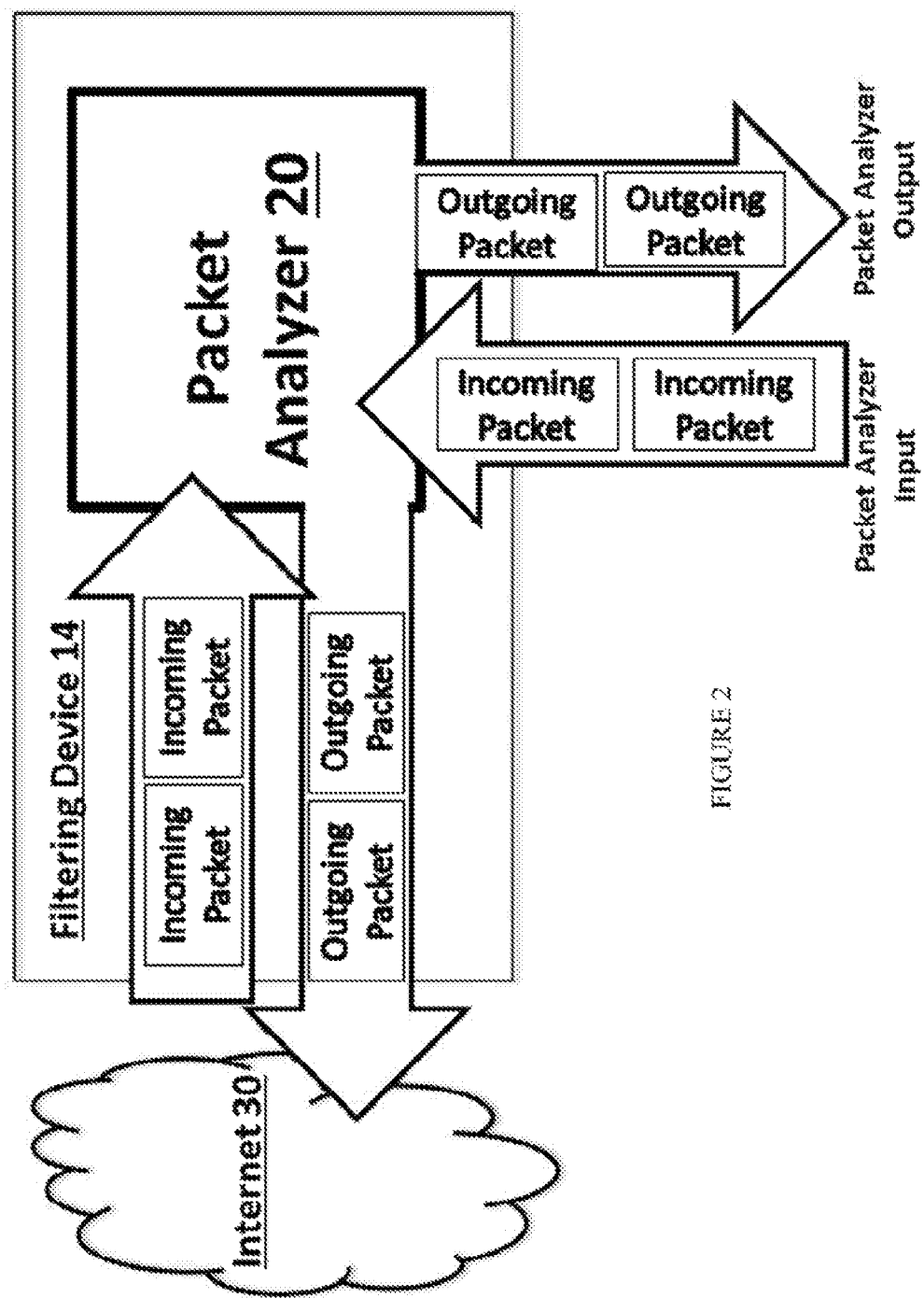
FIG. 2 is a first diagram illustrating various aspects of a filter device disposed within the communication path between a client and a server and configured to filter media content that is provided to the client, in accordance with aspects of the present disclosure.
Figure 3:
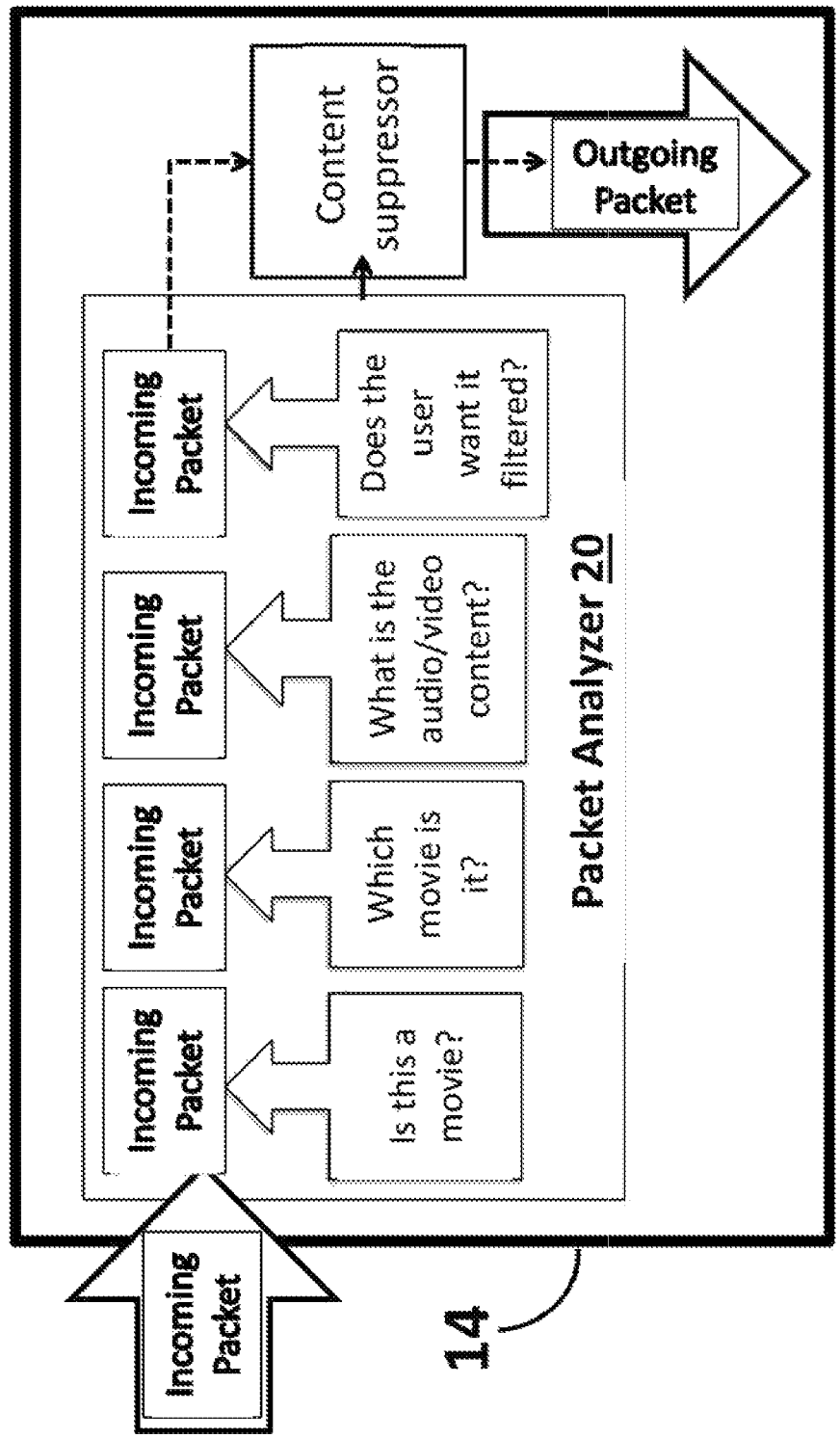
FIG. 3 is a second diagram illustrating various aspects of a filter device disposed within the communication path between a client and a server and configured to filter media content that is provided to the client, in accordance with aspects of the present disclosure.
Figure 4:
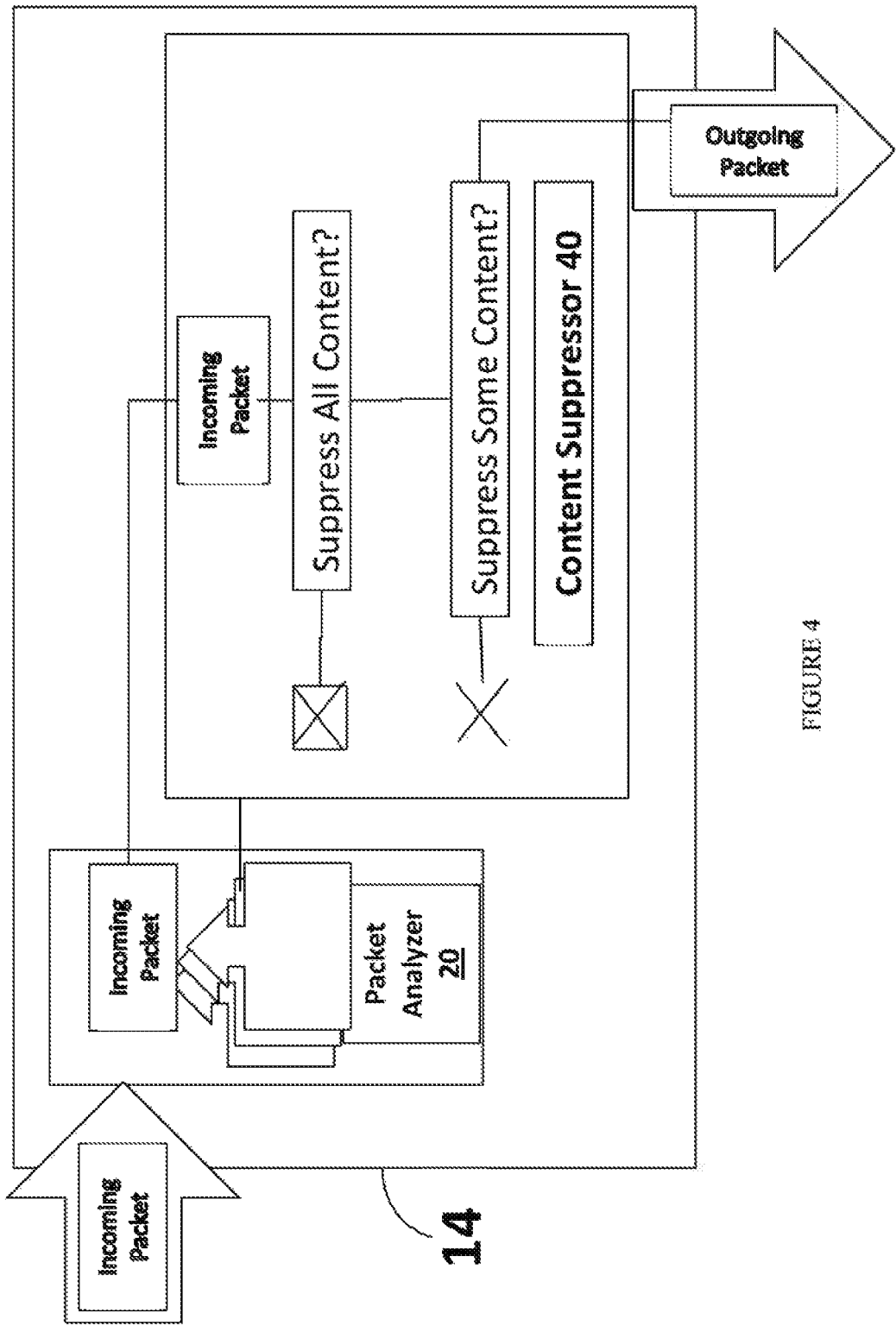
FIG. 4 is a third diagram illustrating various aspects of a filter device disposed within the communication path between a client and a server and configured to filter media content that is provided to the client, in accordance with aspects of the present disclosure.

FIGS. 2 through 4 illustrate certain example operations that may be performed primarily, if not entirely, at the filtering device 14 to effect the filtering/suppression of media content.

FIG. 2 illustrates the filtering device 14 of FIG. 1 configured according to certain example embodiments. In this example, filtering device 14 includes a packet analyzer 20 specially configured and programmed to effect the filtering/suppression of media content in accordance with user preferences. Media content received from a content source (e.g., from server 16 or from another suitable content source) via a network (e.g., Internet 30 or one or more other suitable networks) flows in packetized form to the packet analyzer 20 of filtering device 14.

The packet analyzer 20 generally analyzes each incoming packet to confirm compliance with a user's filtration/suppression settings. Based at least on that analyses, the packet analyzer 20 performs any necessary filtration/suppression to remove an unwanted media from the stream before routing it onward to the user's client 12 for playback. In certain instances, the content filtration/suppression may be the entire content of the packet or portions of the packet. If it is determined no filtration/suppression is necessary for a given packet, the packet may be allowed to continue onward to the client 12 unchanged.

FIG. 2 further illustrates that packet analyzer 20 may receive incoming input (e.g., from client device 12 or another suitable input device). The input may be interpreted to configure user preferences concerning the type of media to filter/suppress from incoming media streams (e.g., profane language, sexually explicit content, graphic violence, advertisements, and so on).

FIG. 2 also illustrates that filtering device 14 may be configured to construct and send outgoing packets via the Internet to a content source (e.g., content server 16). Such outgoing packets may be used, for example, to instruct content server 16 on which packets to send next, such as in the case where a user's settings dictate that a particular scene in a movie should be jumped over. In certain instances, filtering device 14 may configure the outgoing packet to emulate instructions normally originating at the client 12.

FIG. 3 illustrates certain additional features and functionality of the filtering device 14 of FIG. 2, in accordance with certain example embodiments. In this example, filtering device 14 includes a packet analyzer 20 a content suppressor 40 specially configured to collectively effect the filtering/suppression of media content in accordance with user preferences. Packet analyzer 20 and content suppressor 40 may be implemented in hardware and/or software of the filtering device 14. Although FIG. 3 symbolically illustrates packet analyzer 20 and content suppressor 40 separately (to facilitate their description), packet analyzer 20 and content suppressor 40 may be integrated together.

As shown in FIG. 3, the filtering/suppression of incoming media content in packetized form may involve one or more of a variety of determinations. For example, the content may be analyzed by packet analyzer 20 to determine whether it is classified as a movie and, if so, a unique identity of the movie. Additionally, or alternatively, the content may be analyzed by packet analyzer 20 to identify or otherwise classify its video and/or audio content. This may be effected, for example, using speech analysis of an audio stream and/or visual analysis of the video stream. Additionally, or alternatively, this may be effected by comparing incoming packets with packets previously identified for this same data stream.

Once the content has been analyzed, a determination may be made as to whether the user's settings dictate that the incoming packet should be filtered/suppressed. This determination may involve, for example, determining whether the identified content matches criteria established in a user's settings and/or or crosses a predetermined threshold identified in the user's settings for content suppression.

The result of the analysis may be communicated to content suppressor 40, which may then control the filtering/suppression of packets as needed. To the extent any portion of the media has not been filtered or suppressed, it is then forwarded onward to the client 12 as an outgoing packet(s).

The example filtering/suppression process outlined above may be repeated during the course of streaming requested media content from content source 16 to content player 12. Certain embodiments may be configured to perform an analysis and filtration/suppression at a granular packet level. Other embodiments may perform analysis and filtration/suppression of multiple packets at a time.

FIG. 4 illustrates certain additional features and functionality of the filtering device 14 of FIG. 2 and the content suppressor 40 of FIG. 3, in accordance with certain example embodiments. Filtering device 14 may be further configured to determine whether all, some, or none of the content of a particular packet should be suppressed/filtered. As shown in FIG. 4, this determination may be effected, for example using content suppressor 40. Alternatively, packet analyzer 20 may be configured to perform the determination, either in conjunction with content suppressor 40, or independent of content suppressor. As explained with reference to FIG. 3, this may involve, for example, determining whether the identified content matches criteria established in a user's settings and/or crosses a predetermined threshold identified in the user's settings for content suppression.

Figure 5:
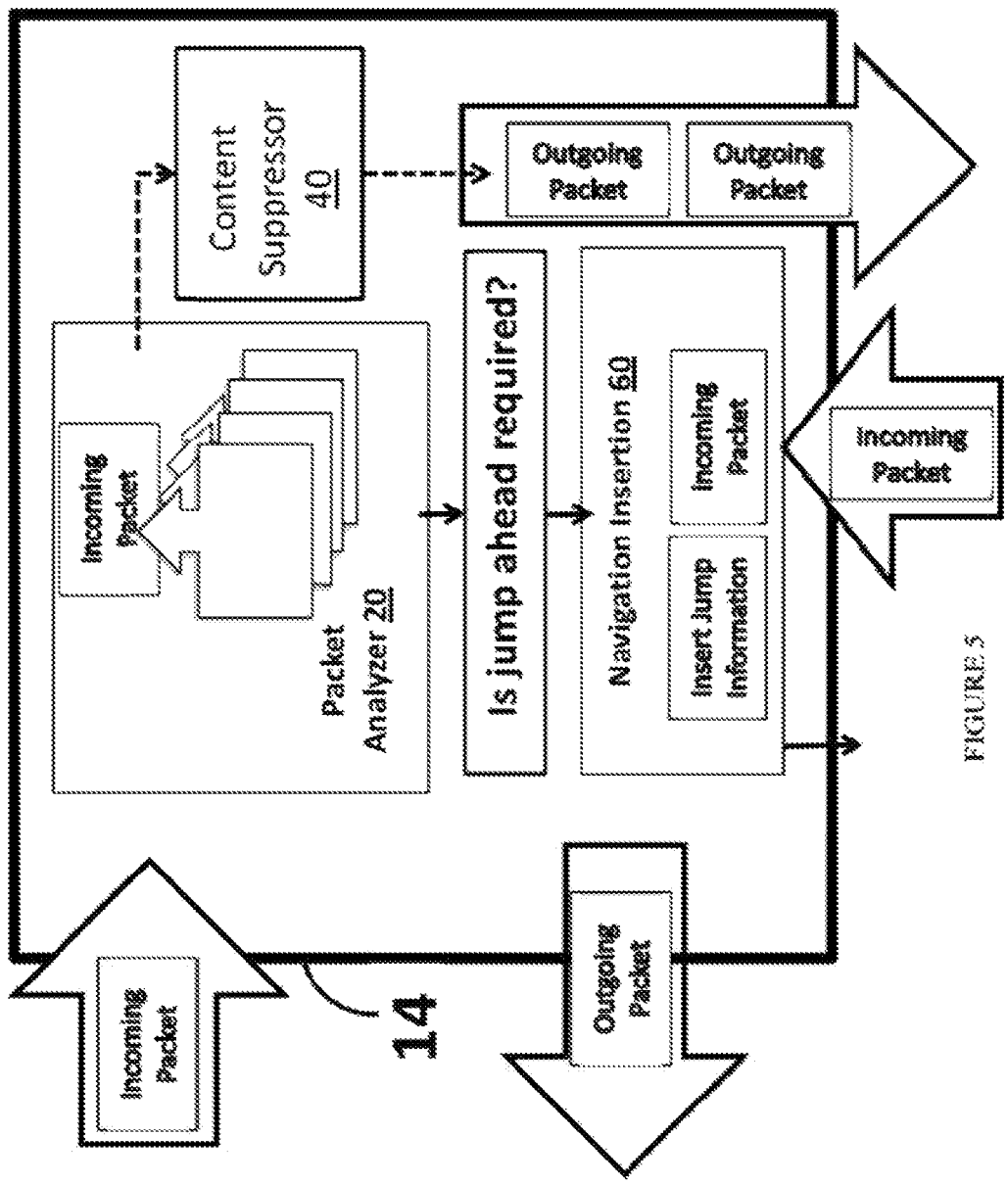
FIG. 5 is a fourth diagram illustrating various aspects of a filter device disposed within the communication path between a client and a server and configured to filter media content that is provided to the client, in accordance with aspects of the present disclosure.

FIG. 5 illustrates certain additional features and functionality of the filtering device 14 of FIG. 2 and the content suppressor 40 of FIG. 3, in accordance with certain example embodiments. As shown in FIG. 5, incoming packetized content may be analyzed and filtered/suppressed, as explained with references to FIGS. 1 through 4. A determination can also be made that the amount of content requiring suppression is sufficient enough that a "jump" command is inserted into the packets being relayed back to the content source 12. This jump command will advance to a subsequent point of the streaming media, thereby minimizing the need to analyze and suppress what would otherwise likely be objectionable content.

Figure 6:
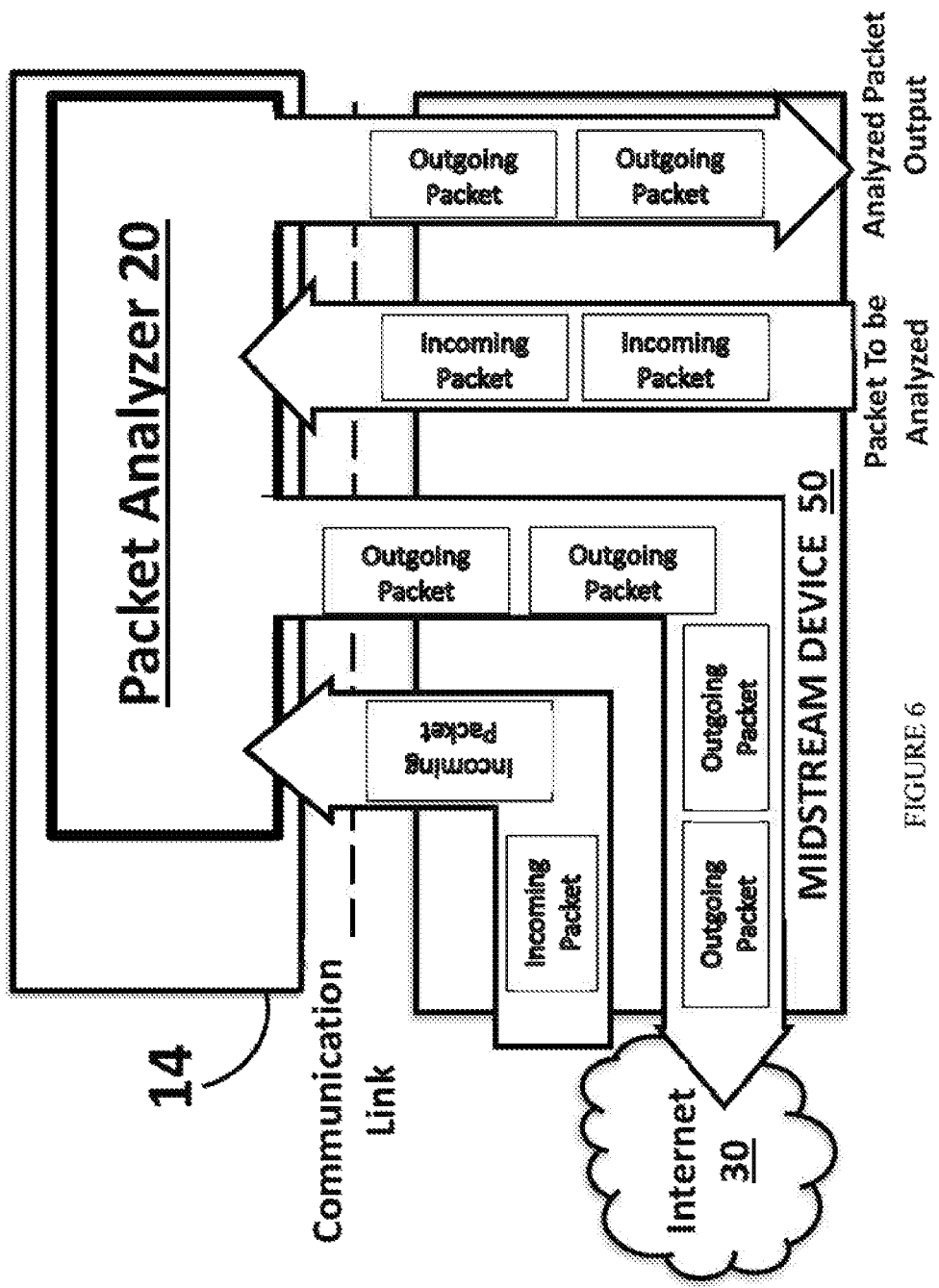
FIG. 6 is a fifth diagram illustrating various aspects of a filter device disposed within the communication path between a client and a server and configured to filter media content that is provided to the client, in accordance with aspects of the present disclosure.

FIG. 6 illustrates an alternative embodiment having a filtering device 14 (and a packet analyzer 20 included therein) physically separate from another midstream device 50 also disposed within the communication path between content server 16 and client 12. In certain embodiments, midstream device 50 may be a modem and/or router located proximate to filtering device 14 (e.g., within the same building). In alternative embodiments, midstream device 50 may be located remote from filtering device 14 and/or client 12 (e.g., where midstream device 50 is implemented as part of a cellular tower of a cellular network).

In the illustrated embodiment, midstream device 50 connects filtering device 14 to the Internet. Filtering device 14 and midstream device 50 may communicate with each other via a communication link. In certain instances, such as, for example, when filtering device 14 and midstream device 50 are both located sufficiently proximate one another, it may be practical to use a hardwire interconnection. Alternatively, filtering device 14 and midstream device 50 may intercommunicate wirelessly. Although not shown, one or more interposing devices may be used to facilitate the communication between filtering device 14 and midstream device 50.

The components of the systems and apparatuses disclosed herein may be integrated or separated. For example, in certain embodiments, packet analyzer 20 and content suppressor 40 may be integrated together (e.g., within hardware and/or software) as part of a structural and functional whole. While certain example embodiments describe packet analyzer 20 as an integral part of filtering device 14, various other embodiments may use a distributed system having packet analyzer 20 and filtering device 14 physically separate from on another.

Moreover, the operations of the systems and apparatuses may be performed by more, fewer, or other components. The methods may include more, fewer, or other steps. Additionally, steps may be performed in any suitable order. Particular operations of the systems and apparatuses disclosed herein may be performed using any suitable logic embodied in computer-readable media. As used in this document, "each" refers to each member of a set or each member of a subset of a set.

To aid the Patent Office, and any readers of any patent issued on this application, in interpreting the claims appended hereto, applicant notes that there is no intention that any of the appended claims invoke paragraph 6 of 35 U.S.C. § 112 as it exists on the date of filing hereof unless the words "means for" or "step for" are explicitly used in the particular claim.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for filtering streaming media content, the method comprising:
   receiving, at a midstream filtering system in communication with and effected independently from a content source, one or more user settings comprising a criteria for filtering a portion of a streaming media content;
   receiving, from a content source and at the midstream filtering system, one or more packets of a source data stream, the source data stream comprising one or more of an audio component and a video component of the streaming media content;
   determining, at the midstream filtering system, a unique identity of the streaming media content by comparing at least a portion of one or more packets of the streaming media content to a previously identified portion of the streaming media content;
   matching, at the midstream filtering system, the determined unique identity of the streaming media content to a filtering action, wherein the filtering action is based at least in part on the criteria of the one or more user settings;
   executing, at the midstream filtering system and based on the unique identity of the streaming media content matching the filtering action, the filtering action on the portion of the one or more packets of the source data stream received from the content source; and
   communicating to a media-playing system a filtered data stream generated at least in part by performing the filtering action on the one or more packets of the source data stream.

2. The method of claim 1, wherein the filtering action is selected from the group consisting of: suppressing audio content and suppressing video content.

3. The method of claim 1, wherein the executing the filtering action further comprises:
   decoding the one or more packets of the source data stream; and
   determining whether the decoded one or more packets matches content filtration criteria of the one or more user settings.

4. The method of claim 1, wherein the one or more user settings are stored within the midstream filtering system.

5. The method of claim 1, further comprising determining at the midstream filtering system whether the source data stream satisfies a classification selected from the group consisting of: a movie classification, an audio classification, and a video classification.

6. The method of claim 1, wherein executing the filtering action on the one or more packets comprises comparing the one or more packets with one or more previously analyzed at the filtering system for the source data stream.

7. The method of claim 1, wherein executing the filtering action on the one or more packets comprises determining whether the identified content crosses a predetermined threshold identified in the one or more user settings for content suppression.

8. The method of claim 1, further comprising determining that an amount of data of the source data stream requiring suppression exceeds a predetermined threshold; and, in response to that determination, communicating a jump command from the midstream filtering system to the content source, the jump command causing the content source to advance from a first portion of the source data stream to a second portion of the source data stream, such that the content source skips over and does not transmit one or more packets of the source data stream arranged between the first and second portions.

9. The method of claim 1, wherein the filtering system communicatively couples the media playing system to the content source.

10. The method of claim 1, wherein the one or more packets received from the content source comprise a data integrity checksum corresponding to the one or more packets of the source data stream; and wherein communicating to the media-playing system the filtered data stream further comprises communicating a modified data integrity checksum corresponding to the filtered data stream.

11. The method of claim 1, further comprising determining at the midstream filtering system the unique identity of the streaming media content based on one of the one or more packets of the source data stream.

12. The method of claim 1, wherein determining the unique identity of the streaming media content based on the portion of the one or more packets comprises analyzing an audio portion of the one or more packets of the source data stream.

13. The method of claim 1, wherein determining the unique identity of the streaming media content based on the portion of the one or more packets comprises analyzing a video portion of the one or more packets of the source data stream.

14. The method of claim 1, further comprising transmitting, from the midstream filtering system and to the media-playing system, an instruction to request the source data stream from an emulation device different than the content source.

15. The method of claim 1, wherein the media-playing system is distinct from the midstream filtering system, the midstream filtering system operating independently of the content source and the media-playing system.

16. The method of claim 1, wherein the midstream filtering system comprises a server in communication between the content source and the media-playing system, the server in communication with and providing filtered content to a plurality of media-playing systems.

17. The method of claim 1, wherein the midstream filtering system is implemented at a cellular transmission tower of a telephone cellular network.

* * * * *